July 8, 1924.

G. A. WEARHAM 1,500,973

MEANS FOR RELEASABLY SUSPENDING A MASS AND FOR LIKE PURPOSES

Filed March 2, 1921      2 Sheets-Sheet 1

July 8, 1924. 1,500,973
G. A. WEARHAM
MEANS FOR RELEASABLY SUSPENDING A MASS AND FOR LIKE PURPOSES
Filed March 2, 1921 2 Sheets-Sheet 2

Patented July 8, 1924.

1,500,973

UNITED STATES PATENT OFFICE.

GORDON AUGUSTUS WEARHAM, OF LONDON, ENGLAND.

MEANS FOR RELEASABLY SUSPENDING A MASS AND FOR LIKE PURPOSES.

Application filed March 2, 1921. Serial No. 449,209.

*To all whom it may concern:*

Be it known that I, GORDON AUGUSTUS WEARHAM, a subject of the King of the United Kingdom of Great Britian and Ireland, and residing at Myrtle Lodge, 159, Lewisham Road, London, S. E. 13, England, have invented new and useful Improvements in or Relating to Means for Releasably Suspending a Mass and for Like Purposes, of which the following is a specification.

This invention relates to apparatus for suspending a load or loads at two points and has for its object an apparatus whereby the release of the load or loads is effected at both points simultaneously. A further object of the invention is to ensure that, in the event of the load at one point or one load alone becoming released by reason of accident or damage, the connection of the load at the other point or the other load is released automatically.

The apparatus which forms the subject of this invention is more particularly adapted for the releasable suspension from aircraft of loads which are too heavy or otherwise unsuitable for suspending from a single point, or for the releasable suspension from a single point, which loads must be released simultaneously to prevent the aeroplane being thrown out of balance.

For convenience the apparatus will be described and claimed with reference to a single load suspended from two points, but it is to be understood that the apparatus is equally applicable to the suspension of two loads each suspended from a single point.

Apparatus constructed in accordance with this invention comprises two load-suspending and releasing devices connected with a coupling piece which is capable of two independent motions, one of which is adapted to release the load at both points simultaneously and the other of which is adapted to release the load at one point if the connection with the load-suspending and releasing device at the other point be ruptured.

Figure 1:
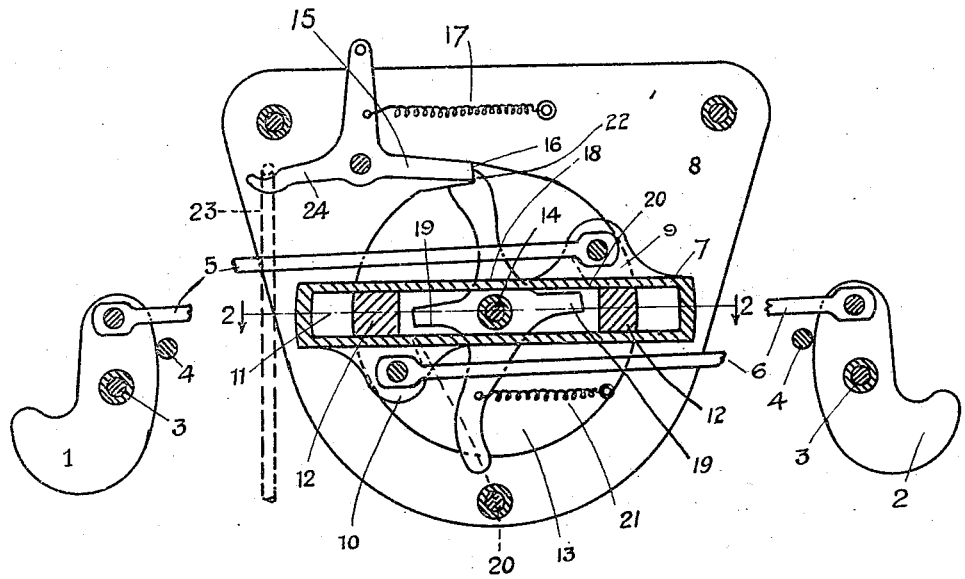
Figure 2:
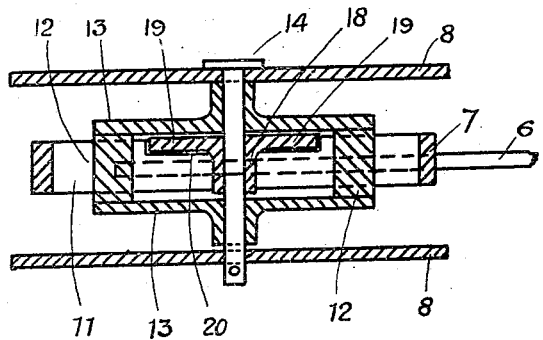
Figure 3:
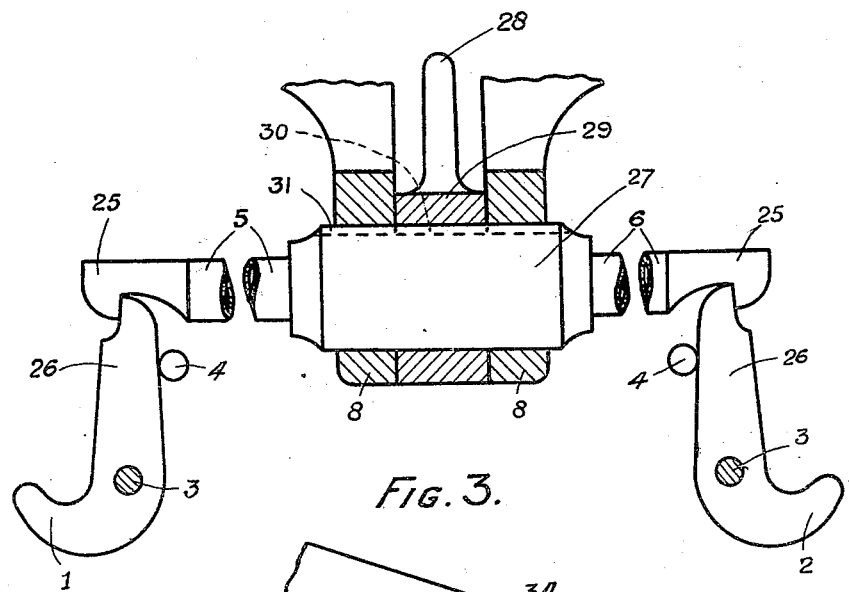
Figure 4:
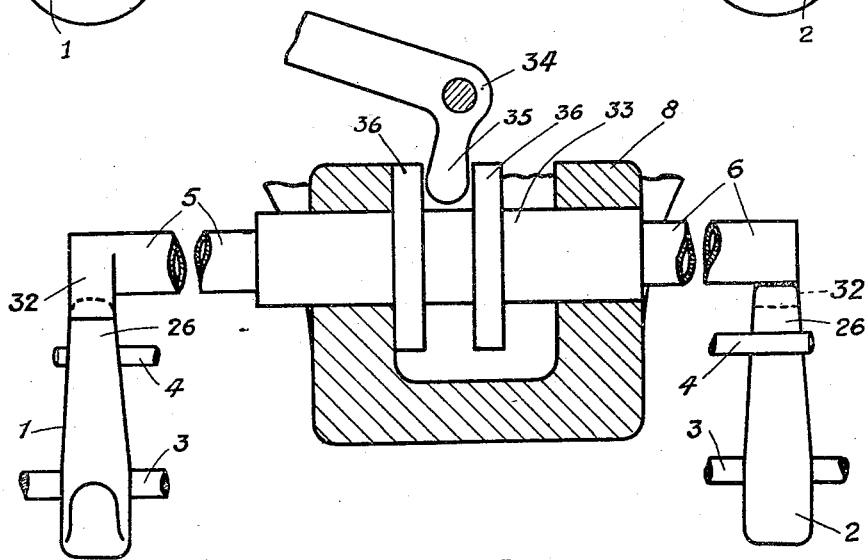

In the accompanying drawings Figure 1 is a sectional elevation of one form of the apparatus, Figure 2 is a section on the line 2—2 of Figure 1, and Figures 3 and 4 are sectional elevations of modified forms of the apparatus.

1 and 2 are two suspending and releasing devices which constitute two points from which the load is suspended. The simplest form of suspending device is shown, but any form may be employed. As shown hooks 1 and 2 adapted to turn on pivot pins, 3, 3, fixed to the frame (not shown) of the body to which the load is suspended, have their motion, in the direction opposite to that in which they turn to release the load, limited by stops 4, 4, also fixed to said frame, and in the form of the invention shown in Figures 1 and 2 they are connected by rods or tubes 5 and 6 respectively with a coupling piece 7 which is supported by a bracket 8 attached to the body from which the load is suspended. The coupling piece 7 has two lugs 9 and 10 to which the two connecting rods 5 and 6 are pivoted respectively whilst the central portion of said coupling piece 7 has a slot 11, in which engage two cross pieces 12, 12, attached between two discs 13, 13, which are adapted to turn on a central shaft 14.

The discs 13, 13, are normally prevented from turning in a counter-clockwise direction by a trigger 15 which engages in a notch 16 in one of the discs 13, and is held in the said notch by a spring 17 attached at its one end to the trigger 15 and at its other end to the bracket 8.

The weight of the load on the two hooks 1 and 2 tends to turn said hooks so as to release the load, and the force tending so to turn them is transmitted through the connecting rods 5 and 6 to the coupling piece 7, but as said connecting rods are pivoted to the two lugs 9 and 10 at opposite ends of a diameter which is inclined to the direction of the connecting rods 5 and 6, both the forces transmitted along these rods tend to turn the coupling piece in a counter-clockwise direction. By reason, however, of the cross pieces 12, 12, attached to the discs 13, 13, engaging in the slot 11 of the coupling piece 7, the latter cannot turn without also turning the discs 13, 13, and consequently the turning of the hooks 1 and 2 to release the load is prevented by the engagement of the trigger 15 in the notch 16 of a disc 13, but, when the trigger 15 is pulled to release said discs 13, said discs and the coupling piece 7 are permitted to turn and the hooks 1 and 2 are both permitted to release the load by turning under the weight thereof.

By pulling the trigger 15 therefore, the load is released at both points of suspension simultaneously by means of the partial rotation of the coupling piece 7.

The coupling piece 7 has a second motion independent of the said partial rotation, in that it is adapted to slide over the cross pieces 12, 12, approximately in the direction of either of the points of suspension, and the forces transmitted along the connecting rods 5 and 6 due to the weight of the load, tend to slide the coupling piece 7 in the direction of each of the two hooks 1 and 2 respectively, that is to say in two opposite directions. In practice the forces in the two connecting rods 5 and 6 are approximately equal and therefore there is little resulting force tending to slide the coupling piece 7. If, however, either of the connecting rods 5 or 6 be ruptured or disconnected accidentally from its hook or its lug on the coupling piece 7, thereby allowing the load to be released at its hook, the coupling piece 7 is free to slide under the action of the force in the other connecting rod and therefore permit the other hook to turn so as to release the load.

This sliding motion of the coupling piece 7 therefore provides for the automatic release of the load at either point in the event of the load being released at the other point by reason of rupture or disconnection of the connecting rod at the latter point.

It is preferable that, if the suspending and releasing device at either of the two points of suspension of the load be unable to operate to release the load by reason of damage or other cause, it should be impossible to release the load at the other point by pulling the releasing trigger 15.

In the apparatus as described so far, the pulling of the trigger 15 would permit the release of the load at one point even if the hook at the other point were unable to operate to release the load, by means of a combined rotating and sliding motion of the coupling piece 7. To prevent this combined motion, a locking piece 18 is provided which, on pulling the trigger 15 locks the coupling piece 7 against its sliding motion. When so locked, the coupling piece 7 can only be rotated as both of the hooks turn to release the load, and if either of them can not so turn the coupling piece 7 is unable to rotate and therefore prevents the other hook from turning to release the load.

The locking piece 18 is pivoted on the central shaft 14 and has two projections 19, 19, adapted to enter two recesses 20, 20, (shown in dotted lines in Figure 1) in the coupling piece 7. In the normal position shown in Figure 1 the projections 19, 19, are free of the said recesses and the coupling piece 7 is therefore free to slide. A spring 21 attached at its one end to the locking piece 18 and at its other end to a disc 13 tends to turn the locking piece 18 to cause the projections 19, 19, to enter the recesses 20, 20, but the locking piece 18 is normally prevented from so turning by engagement of the trigger 15 with a notch 22 in the locking piece 18.

The radial distance of the lip of the notch 22 from the axis of the shaft 14 is less than that of the lip of the notch 16, so that on pulling the trigger 15 the locking piece 18 is released to start its turning motion more quickly than the coupling piece 7 and consequently it locks the coupling piece against sliding movement by engagement of its projections 19, 19, in the recesses 20, 20, of said coupling piece.

In the event of the load being accidentally released at one point by reason of the rupture of a suspending device at a position which does not leave the corresponding connecting rod free to move, for instance, by reason of the rupture of a suspension hook below its pivot, the release of the load at the other point may be effected by a connection 23 (shown in dotted lines in Figure 1) between a third point on the load and an arm 24 on the trigger 15, said connection operating to pull said trigger to release the load when the load falls from its suspension at either point. The connection 23 normally takes no strain and may be a light cord which will break when the load falls without damaging the trigger, or it may be arranged to slip off the arm 24 of the trigger when the latter is turned, and in this case it is preferably yieldingly retained on said arm by a spring clip (not shown).

Figure 3 shows an alternative form of the apparatus in which the two hooks 1 and 2 are prevented from turning to release the load by hooks 25, 25, which engage with arms 26, 26, extending upwardly from the two hooks 1 and 2. The hooks 25, 25, are formed on the ends of the connecting tubes 5 and 6 which are attached to a coupling piece 27, adapted to rotate in and to slide through the bracket 8 and said hooks 25, 25, are adapted to release the hooks 1 and 2 by rotation of the coupling piece 27, together with the two connecting tubes 5 and 6. Rotation of the coupling piece 27 to release the hooks 1 and 2 is effected by turning an arm 28 attached to a sleeve 29 which is provided with a key 30 engaging in a keyway 31 formed in the coupling piece 27. The release of the load at both points of suspension simultaneously can therefore be effected by pulling the arm 28. Further if either of the connecting tubes cannot be turned, the arm 28 is prevented from moving so as to release the load at the other point.

In the event of either of the two connecting tubes 5 or 6 being ruptured with the consequent release of the load at one point, the coupling piece 27, together with the other connecting tube is free to move by sliding in the bracket 8, so as to release the load at the other point.

Figure 4 shows a third form of the apparatus in which the axes of the pivot pins 3, 3, of the hooks 1 and 2 are parallel with those of the connecting tubes 5 and 6 and in which said hooks 1 and 2 have upwardly extending arms 26, 26, which engage with downwardly extending projections 32, 32, from the tubes 5 and 6 which are attached to a coupling piece 33. The two hooks 1 and 2 tend, under the weight of the load, to turn in opposite directions and therefore their actions on the projections 32, 32, which prevent them from turning, has the effect of tending to turn the whole piece, consisting of the two connecting tubes 5 and 6 and the coupling piece 33, in opposite directions. The coupling piece 33 is adapted to turn in and also to slide through the bracket 8 so that in the event of either of the connecting tubes 5 or 6 being ruptured with the consequent release of the load at one point, the hook at the other point is able to release the load by turning its connecting tube and the coupling piece 33.

The release of the load at the two points simultaneously is effected by sliding the coupling piece 33 to the right Figure 4, by means of a lever 34 having an arm 35 engaging between collars 36, 36, attached to the coupling piece 33, so that the two projections 32, 32, are slidden out of engagement with the arms 26, 26, of the hooks 1 and 2. In this form of the apparatus also, the lever 34 cannot be moved to release the load at either point if the load cannot be released at the other point.

The connection 23, illustrated in Figures 1 and 2, between the arm 24 of the trigger 15 and the load, is equally applicable to the forms of the invention shown in Figures 3 and 4 the said connection being made between the load and the lever 28 in the apparatus shown in Figure 3 and between the load and an arm of the lever 34 in the apparatus shown in Figure 4.

In the forms of the apparatus shown in Figures 1, 2 and 3 the suspending hooks are of the type in which the weight of the load produces a tension in the connecting rods or tubes 5 and 6, but the hooks could be reversed so as to produce a compression in these members without other alteration in the apparatus than a rearrangement of the parts. Further, the hooks or other suspending means can be of the type in which the weight of the load produces no force in the members connecting them with the coupling piece, but in this case either a spring must be employed to turn the discs 13, 13, of the apparatus shewn in Figures 1 and 2, or the trigger 15 must be replaced by an arm connected with the discs 13, 13, so as to turn them positively. Further in order to ensure the automatic release of the load at one point in the event of the rupture of the rod connecting the coupling piece with the other point, springs must be employed to actuate either of the suspending devices when the coupling piece is permitted to slide.

In the event of the discs 13, 13, being turned by a spring or positively, the pivoting points of the connecting rods on the coupling piece may be in line with the rods in their normal position.

When the suspending hooks are of the type in which the weight of the load produces no force in the members connecting them with the coupling piece, the hooks may turn to release the load in the same sense or in opposite senses, but when they are of the type which does produce such force, they are preferably arranged to turn in opposite senses. They may however, be arranged to turn in the same sense by adopting a modified and less convenient form of the apparatus, in which the coupling piece takes the form of a single member connecting the two hooks and is provided at any point with a projection which engages with a stop which prevents the motion of the coupling piece to release the load at both points and can be withdrawn to permit such release. The coupling piece is in tension on one side of the said projection and in compression on the other side and the constructional form given to it may therefore differ on the two sides of the projection. In order to ensure automatic release of the load at one point if the load at the other be released accidentally, a connection must be made between a third point of the load and the stop, such that the stop will be withdrawn if the load fall from either point of suspension.

The word "simultaneous" is used herein and in the claims to indicate the release of the load at both points as the result of a single operation of the apparatus, or of accidental release at one point and automatic release at the other, even though the release at one point may occur a fraction of a second before that at the other point.

It is, however, sometimes desirable that the load should be released at one point a very short time before it is released at the other point, and this is preferably effected in the case of that form of the apparatus shown in Figures 1 and 2 by introducing into the rods 5 and 6 coupling screws with right and left handed threads or other devices for adjusting the lengths of the rods, and in the case of the forms of the apparatus shown in Figures 3 and 4 by making the stops 4, 4, adjustable in position.

In the form of the apparatus shown in Figures 1 and 2 the coupling piece 7 may be provided with projections engaging in slots in the discs 13, 13, instead of being slotted to receive the cross-pieces 12, 12, and/or the locking piece 18 may be replaced by curved plates attached to the bracket 8 and so located close to the ends of the coupling piece 7 that the latter, while free to slide when in the position shown, is brought between the said curved plates and thereby prevented from sliding, as soon as the coupling piece has turned through a small angle.

I claim:—

1. Apparatus for suspending a load at two points and releasing it at both points simultaneously, comprising two load suspending and releasing devices connected with a coupling piece which is capable of two independent motions, one of which is adapted to release the load at both points simultaneously and the other of which is adapted to release the load at one point if the connection with the load suspending and releasing device at the other point be ruptured.

2. In apparatus for suspending a load at two points and releasing it at both points simultaneously, two load suspending and releasing devices, a coupling piece connecting the said two devices capable of one motion adapted to release the load at one point if the connection with the load suspending and releasing device at the other point be ruptured, and capable of an independent motion, adapted to operate the two load releasing devices, only when both said devices are operable.

3. In apparatus for suspending a load at two points and releasing it at both points simultaneously, two load suspending and releasing devices, a coupling piece connecting the two said devices, a controlling member to control the motion of the said coupling piece and normally preventing its motion to release the load, and a connecting device connecting the load with the controlling member, adapted on a partial fall of the load to actuate the controlling member and permit the motion of the said coupling.

4. In apparatus for suspending a load at two points and releasing it at both points simultaneously, two load suspending and releasing devices and a coupling piece capable of two independent load releasing motions one curvilinear and the other rectilinear so connecting the said two devices that the weight of the load at either point of suspension tends to move said coupling either curvilinearly or rectilinearly to release the load at that point.

5. In apparatus for suspending a load at two points and releasing it at both points simultaneously, two suspending and releasing devices, a coupling piece connecting the two said devices capable of two independent motions, a controlling member to control the motion of the said coupling piece and normally preventing its motion to release the load at both points simultaneously, and a connecting device connecting the load with the controlling member adapted on a partial fall of the load to actuate the controlling member and permit the motion of the said coupling.

6. In apparatus for suspending a load at two points and releasing it at both points simultaneously, two load suspending and releasing devices, a coupling piece capable of two independent load releasing motions one curvilinear and the other rectilinear so connecting the said two devices that the weight of the load at either point of suspension tends to move said coupling piece either curvilinearly or rectilinearly to release the load at that point, and a trigger adapted normally to prevent the motion of the coupling piece to release the load at both points simultaneously.

7. In apparatus for suspending a load at two points and releasing it at both points simultaneously, two suspending and releasing devices, a coupling piece connecting the two said devices capable of two independent load releasing motions one curvilinear and the other rectilinear, a trigger adapted normally to prevent the motion of the coupling piece to release the load at both points simultaneously, and a connecting device connecting the load with the trigger and adapted to actuate it on partial fall of the load.

8. In apparatus for suspending a load at two points and releasing it at both points simultaneously, two load suspending and releasing devices and a coupling piece capable of two independent load releasing means one curvilinear and the other rectilinear so connecting the said two devices that the weight of the load at one point of suspension tends to move said coupling piece either curvilinearly or rectilinearly to release the load at the point and the weight of the load at the other point tends to move said coupling piece in the opposite direction either curvilinearly or rectilinearly to release the load at the latter point.

9. In apparatus for suspending a load at two points and releasing it at both points simultaneously, two load suspending hooks adapted to turn in opposite senses to release the load, a coupling piece connecting the two hooks and capable of two independent motions one of which is adapted to release the load at both points simultaneously and the other of which is adapted to release the load at one point if the connection with the hook at the other point be ruptured.

10. In apparatus for suspending a load at two points and releasing it at both points simultaneously, two load suspending and releasing devices and a coupling piece connecting the said two devices and capable of a motion of partial rotation and a motion of sliding in the direction of its length, one of the said motions being adapted to release the load at both points simultaneously and the other motion being adapted to release the load at one point if the connection with the load suspending and releasing device at the other point be ruptured.

11. In apparatus for suspending a load at two points and releasing it at both points simultaneously, two load suspending and releasing devices, a coupling piece connecting the said two devices and capable of a motion of partial rotation and a motion of sliding in the direction of its length, one of the said motions being adapted to release the load at both points simultaneously and the other motion being adapted to release the load at one point if the connection with the load suspending and releasing device at the other point be ruptured, and a locking piece adapted to prevent the latter motion of the coupling piece when said coupling piece is permitted to move to release the load at both points simultaneously.

12. In apparatus for suspending a load at two points and releasing it at both points simultaneously, two load suspending and releasing devices, a piece connecting the two said devices and capable of two independent motions controlling means normally preventing one of such independent motions and two stops adapted to limit the motion of the said devices in the direction opposed to that of their motion for release of the load and thereby normally preventing the other of the independent motions of the said connecting piece.

In testimony whereof I have affixed my signature.

GORDON AUGUSTUS WEARHAM.